March 6, 1945. H. L. BOWERS 2,370,772
APPARATUS FOR REMOVING IRON DISSOLVED IN WATER
Filed July 12, 1941
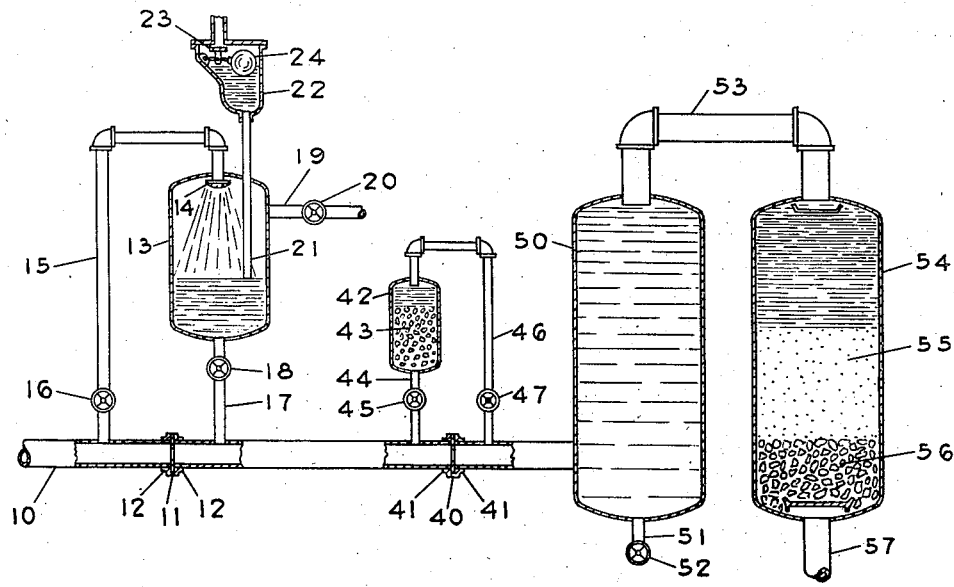
HERBERT L. BOWERS
INVENTOR.
BY
ATTORNEY.

Patented Mar. 6, 1945

2,370,772

UNITED STATES PATENT OFFICE 2,370,772

APPARATUS FOR REMOVING IRON DISSOLVED IN WATER

Herbert L. Bowers, North Bergen, N. J., assignor to The Permutit Company, New York, N. Y., a corporation of Delaware Application July 12, 1941, Serial No. 402,181

3 Claims. (Cl. 210—16)

This invention relates to apparatus for removing iron dissolved in water; and it comprises dividing a flow of water into two portions, adding sufficient oxygen to one of said portions to precipitate all the iron dissolved in all of said water, then mixing said one portion with the other portion, and removing precipitated iron from the mixture, all as more fully set forth hereinafter and as claimed.

Many water supplies, especially well waters, carry in solution considerable quantities of iron in a ferrous state, usually as ferrous bicarbonate, while at the same time containing no appreciable amounts of oxygen. When such water is exposed to oxygen the iron is precipitated as ferric hydroxide. Thus, a glassful of such water exposed to air for even a short period of time becomes cloudy with precipitated iron. Such precipitates which in time form deposits on everything with which the water comes in contact are, of course, highly objectionable, and it has, therefore, become common practice to precipitate the iron from the water by oxidation and then remove the precipitates by coagulation, sedimentation and/or filtration prior to using the water.

Such oxidation is best carried out by spraying the water through air. This can be done at atmospheric pressure, but then the water must be re-pumped which is costly. It can also be done under pressure but then the water readily dissolves air greatly in excess of the amount which can remain in solution at atmospheric pressure. For instance, when water is aerated at a pressure of 50 pounds per square inch it will dissolve more than four times the amount of air which it can hold in solution at atmospheric pressure, and upon exposing the water to atmospheric pressure during use, the excess of air is released in minute bubbles, causing what is commonly termed "milky water" which is most undesirable.

The amount of oxygen required to precipitate the dissolved iron is relatively small, each part by weight of iron requiring about 0.15 parts by weight of oxygen. Thus, one liter of water containing 10 parts per million of iron (a relatively high amount) requires but 1.5 milligrams of oxygen which amount is supplied in about 6 cubic centimeters of air. On the other hand, the solubility of air in water at a temperature of 10° C. is about 23 cubic centimeters per liter at atmospheric pressure and more than 100 cubic centimeters per liter at a pressure of 50 pounds per square inch. These figures show that sufficient oxygen to precipitate the iron can usually be supplied to the water without even approaching the limit of solubility at atmospheric pressure. In practice, however, it has been found very difficult to control accurately the relatively small quantities of air to be supplied to water with sufficient accuracy so that, on the one hand, sufficient air is supplied to precipitate all the iron without, on the other hand, exceeding the solubility at atmospheric pressure, resulting in milky water.

It is an object of my invention to provide a simple apparatus for automatically controlling the amount of air supplied to water in such manner that enough oxygen is supplied to precipitate the iron without at the same time dissolving in the water enough air to cause milkiness.

The manner in which said objects are achieved is shown in the appended drawing in which:

The single figure is a view, more or less diagrammatic, of an apparatus according to my invention.

Referring now to the figure, a water main 10 is provided with an orifice 11 mounted between a pair of flanges 12. A tank 13 is provided at its top portion with a spray nozzle 14 connected to the main 10 on the upstream side of the orifice 11 by a pipe 15 fitted with a valve 16. The lower portion of tank 13 is connected with the main 10 on the downstream side of orifice 11 by a pipe 17 fitted with a valve 18. A pipe 19 with a valve 20 leads from a supply of air under pressure (not shown) to the upper portion of tank 13. A pipe 21 leads from a point within tank 13 a short distance above its bottom to an air relief valve 22 comprising a valve member 23 actuated by a float 24.

A second orifice 40 is provided in main 10 between flanges 41. A tank 42 containing a suitable coagulant 43, such as crystal alum, has its lower portion connected to the main 10 by a pipe 44 provided with a valve 45. The upper portion of tank 42 is connected to main 10 by a pipe 46 fitted with a valve 47. The main leads to a sedimentation tank 50 provided at its lowest point with a sludge outlet 51 controlled by a valve 52. The top of the sedimentation tank 50 is provided with an outlet pipe 53 leading to a filter 54 containing a bed of sand 55 supported on a layer of gravel 56. A pipe 57 leads from the filter 54 to a point of use.

Operation of the apparatus shown in Fig. 1 is as follows. Valve 20 is partly opened so that air under pressure is supplied to tank 13. Valve 16 is throttled and valve 18 is opened, thus causing a by-pass flow of water from main 10 through pipe 15, spray nozzle 14, downwardly through tank 13, and through pipe 17 back to the main 10. This by-pass flow will always be a definite proportion of the flow through the main regardless of what the rate of flow through the main may be, so long as there is an appreciable drop in pressure through orifice 11. The air relief valve 22 releases any excess of air supplied to tank 13 until the water level rises to the lower end of pipe 21 whereupon water rises through pipe 21 to the air relief valve 22 and lifts float 24 which moves valve member 23 to closed position. When more air is supplied to tank 13 through pipe 19 the level in the tank drops slightly, the water drains out of pipe 21 and valve member 23 opens, again releasing the air. Thus, a definite water level is maintained in tank 13.

Valve 16 is partly throttled to control the bypass flow of water through tank 13 so that this water, upon spraying through the air space in tank 13, will dissolve enough oxygen to precipitate all the iron in all the water flowing through the main 10, but not enough air to cause milkiness when the water is discharged from the main to atmospheric pressure.

The proportion of by-pass flow must be determined for each case in accordance with the amount of iron in the water and the pressure of the water supply. Taking the aforementioned example of a water under a pressure of 50 pounds per square inch and containing 10 parts per million of iron in solution, good results will be obtained by adjusting valve 16 to by-pass through tank 13 about 10 per cent of the total amount of water flowing through the main. This by-pass flow will become saturated with air, i. e. it will dissolve about 100 cubic centimeters of air per liter. Upon returning this water to the main the mixture will contain about 10 cubic centimeters of air per liter. That is ample to precipitate the 10 parts per million of iron which theoretically requires about 6 cubic centimeters of air per liter; yet, nitrogen and whatever oxygen is left after the reaction will not be present in an amount large enough to cause milkiness upon release of pressure since the solubility of air in water at atmospheric pressure is of the order of 23 cubic centimeters per liter.

Upon further flow through the main a small stream of water is by-passed around orifice 40 through pipe 44, throttled valve 45, tank 42, pipe 46 and open valve 47 back to main 10. This stream dissolves some of the alum or other coagulant 43 contained in tank 42, forming a floc. The precipitate is agglomerated in the floc so that it is easily removed by settling in tank 50, the sediment collected in tank 10 being periodically discharged to waste through outlet 51 and valve 52. Any small amounts of precipitate left in the water after settling are removed in the filter 54 to which the water flows through pipe 53 so that through pipe 57 there is discharged to a point of use a clear, iron-free water which will not turn milky upon release of pressure.

While the use of coagulation, sedimentation and filtration will always produce a sparklingly clear water, in many cases filtration or sedimentation alone after precipitation produces satisfactory results. When the iron is bound in organic compounds, however, the precipitate obtained by oxidation is in a finely divided colloidal form and usually requires coagulation followed by sedimentation and/or filtration for effective removal.

The apparatus according to my invention disclosed herein achieves the objects set forth in an effective and inexpensive manner. Certain modifications may be made without departing from the spirit of my invention, and reference is, therefore, made to the appended claims for a definition of the scope of my invention.

What I claim is:

1. Apparatus for removing iron dissolved in water which comprises a water main under pressure, a closed tank, means for supplying air to said tank, an air relief valve arranged to maintain a definite water level in said tank, a flow restricting element in said main, a pipe independent of said air supply means and connecting the main on the upstream side of said element with said tank above said water level, another pipe connecting the main on the downstream side of said element with said tank below said water level, and means connected with said main for removing precipitated iron from water.

2. Apparatus for removing iron dissolved in water which comprises a water main under pressure, a closed tank, means for supplying air to said tank, an air relief valve arranged to maintain a definite water level in said tank, a flow restricting element in said main, a pipe independent of said air supply means and connecting the main on the upstream side of said element with said tank, another pipe connecting the main on the downstream side of said element with said tank below said water level, and means connected with said main for removing precipitated iron from water.

3. Apparatus for removing iron dissolved in water which comprises a water main under pressure, a closed tank, means for supplying air to said tank, means for maintaining a definite water level in said tank, a flow restricting element in said main, a pipe independent of said air supply means and connecting the main on the upstream side of said element with said tank, another pipe connecting the main on the downstream side of said element with said tank below said water level, and means connected with said main for removing precipitated iron from water.

HERBERT L. BOWERS.